March 14, 1961   J. A. MAZIARKA   2,974,353
DETACHABLE HANDLE
Filed April 9, 1959
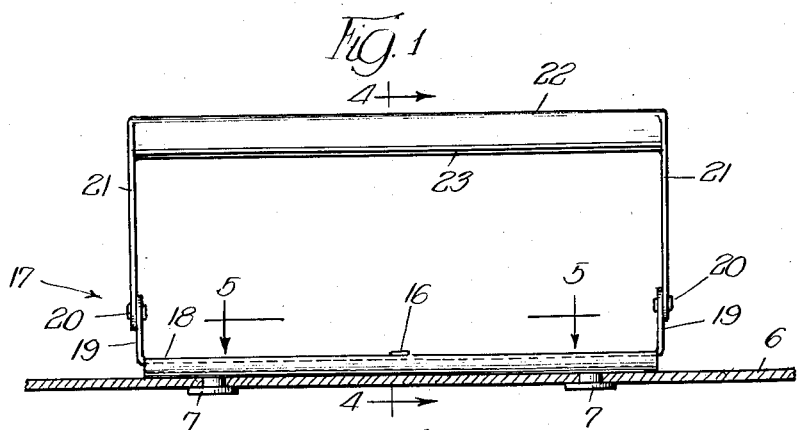
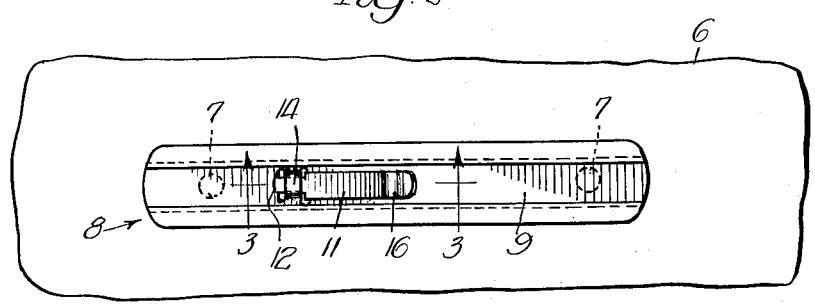
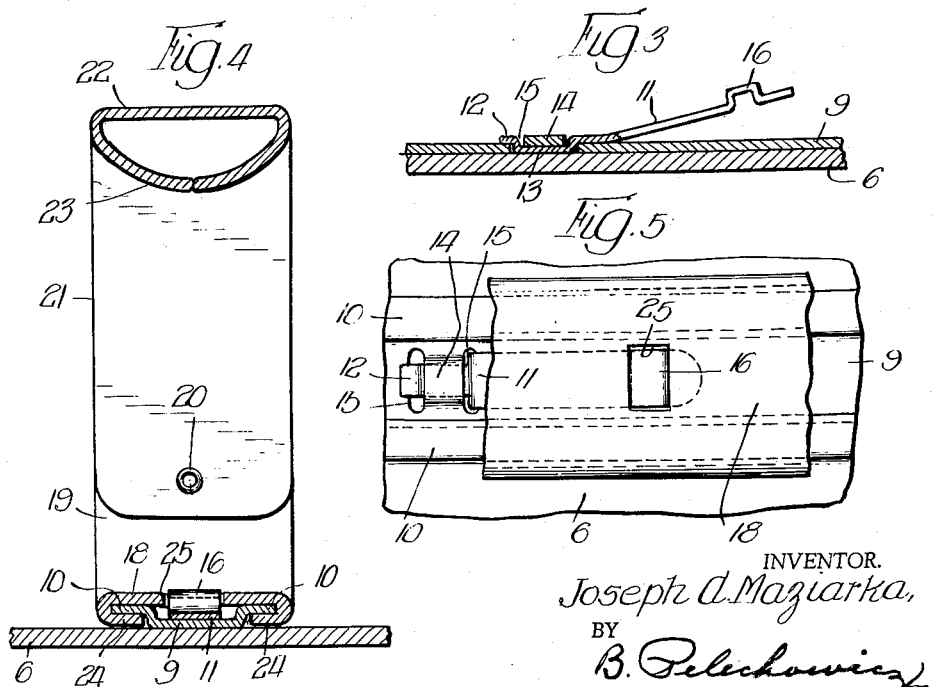
INVENTOR.
Joseph A. Maziarka,
BY
B. Pelechowicz

United States Patent Office 2,974,353
Patented Mar. 14, 1961

2,974,353
DETACHABLE HANDLE
Joseph A. Maziarka, Chicago, Ill.
(7706 Oketo Ave., Niles, Ill.)
Filed Apr. 9, 1959, Ser. No. 805,315
1 Claim. (Cl. 16—114)

The present invention relates to the detachable handles.

In various types of containers, such as suitcases, fishing boxes, tool boxes and the like, a handle permanently attached to the lid or the side of a container, usually constitutes a problem in the packing of the container, because a permanently attached handle defines a bulky projecting part which does not lend itself to easy and efficient packing. Such a handle permanently attached to a container, notwithstanding the usual hinge connection for permitting it to assume a flat contactual position with the lid or the side of a container, still necessitates a filler between the wall of the container to which the handle is attached and the adjacent wall of a packing case. Therefore, the present invention has for its principal object the provision of a detachable handle which may be readily disengaged from the lid or the side of the container and enclosed within the container during its packing and transportation, and which may be readily attached to the container on removal thereof from its packing case.

A still further object of the present invention is the provision, in conjunction with a detachable handle, of a base member permanently attached to the lid or the side of a container, and so constructed that it may only slightly project above the outer face of the lid or the side of a container, thereby eliminating the need of any fillers while packing the container in a packing case, and to which base member the handle may be readily attached when the container is removed from the packing case.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views;

Fig. 1 is a side elevational view of the handle when in an attached position with the lid of a container;

Fig. 2 is a top plan view of a base member, permanently attached to a container lid, in its position when the handle is disengaged therefrom;

Fig. 3 is an enlarged cross sectional view on line 3—3 of Fig. 2;

Fig. 4 is an enlarged cross sectional view through the base member and the handle, the latter in its attached position with the base member, the view having been taken on line 4—4 of Fig. 1; and Fig. 5 is an enlarged, fragmentary, top elevational view of the handle member in its engaged position with the base member, illustrating the means for interengagement of the two when the handle remains in an operative engaged position with the base member.

Referring in detail to the present drawing there is shown therein a lid 6, which may also be a side, of a container. Affixed by means of rivets 7, which also may be welds, is a base member, generally indicated by 8 in Fig. 2. Said base member 8 is formed out of an oblong strip of rigid metallic material to define a central bottom 9, and a pair of raised flanges 10, the latter being in a spaced relation with the adjacent outer face of lid 6, while said bottom 9 remains in a contactual relation therewith and is permanently and rigidly connected with said lid 6 through welds of rivets 7, as is seen in Fig. 4.

A resilient oblong latch member 11, at one of its ends is provided with a reduced tongue 12, longitudinally bent to define a U-shaped cradle 13 (Fig. 3) which defines a seat for a transverse strip 14 struck out from said bottom 9. The sides of said strip 14 are in a spaced relation, as at 15 (Fig. 3) with the adjacent body portions of said bottom 9. When said strip 8 is raised to a sufficient degree from the plane of said bottom 9 said tongue 12 with its U-shaped cradle 13, aided by said spaces 15, may be manipulated until said cradle 13 comes squarely below said strip 14. Thereupon, depressing said strip 14 in a downward direction, until it is seated upon said cradle 13, in a contactual relation therewith, as seen in Fig. 3, sufficient rigid interconnection between said bottom 9 and said latch member 11 will be established. In the operative position of said latch member 11 with said bottom 9 the outer end of said tongue 12 will rest upon the rim defined by the adjacent space 15, while the adjacent end of said latch member 11 will contact with the upper face of said bottom 9, as is seen in Figs. 3 and 5.

The opposite end of said latch member 11 is bent into an inverted U-shaped formation to define latch 16, for the purpose hereinafter stated.

The handle, generally indicated by 17 in Fig. 1, includes a lower horizontal bar 18, from the ends of which upright end members 19 project in a perpendicular relation. Said members 19 may be hingedly connected through pivot pins 20 or the like, with the lower ends of end bars 21, the opposite ends of which connect with the ends of the upper horizontal bar 22. The lateral portions of said upper horizontal bar 22 are bent on an arc in a mutually convergent relation to define hand piece 23 whereby the same may be manually grasped for carrying the container.

The lateral marginal portions of said lower horizontal bar 18 are bent downwardly and then towards each other in a convergent relation to define a pair of flange supporting strips or lips 24, which are in a spaced relation with the adjacent side portions of said lower horizontal bar 18, for accommodating therewithin and interengaging said flanges 10, as is seen in Fig. 4, when the handle is interengaged in an attached relation with said base member 8. Substantially at a central point said lower horizontal bar 18 is provided at its transverse center with slot 25, for accommodating therewithin latch 16.

The operation of handle 17 to engage the same with said base member 18 is quite simple. All that needs to be done is to place the lower horizontal bar 18 of the handle in a longitudinal relation with said base member 8, preferably at the end of the latter which is proximate to tongue 12. In this position strips 24 will contact the adjacent face of lid 6. Pushing the handle toward the end of said base member 8 will cause flanges 10 to enter the spaces defined by said strips 24 and the opposite lateral portions of said horizontal bar 18.

Further pushing of the handle in a longitudinal direction with said base member 8, will cause said lower horizontal bar 18 to slide along said flanges 10 until said horizontal bar 18 coincides with the length of said base member 8. At that very moment latch 16 will spring into slot 25 whereby the said lower horizontal bar 18 will become interlocked in a longitudinal relation with said base member 8. While said latch 16 prevents longitudinal shifting of the handle with relation to said base member 8, the interengaged strips 24 with flanges 10 prevent the disengagement of the handle in a transverse direction with relation to said base member 8.

To detach the handle from said base member 8, all that is required to be done is to depress latch 16 in a downward direction, by using a nail, pencil or the like, until said latch 16 is completely shifted out of said slot 25. When this is done a slight push at the handle in a longitudinal relation with said base member 8 will permit complete detachment of the handle when the shifting movement thereof with relation to said base member 8 is completed.

If the lateral body portions of the horizontal bar 18 with their cooperating lips 24 are in a strong frictional engagement with flanges 10, in that event the frictional interengagement of the said parts will suffice to engage the handle with said base member 8, for most practical purposes, without employment of latch 16 and slot 25. As thus simplified the invention would be complete both structurally and functionally. It is only when the container and the handle would be subjected to heavy duty that an additional interengagement of the horizontal bar 18 with base member 8, through the medium of said latch 16 and slot 25, for preventing the longitudinal shifting movements of the handle with relation to said base member 8, would be required.

From a broader aspect of the invention, flanges 10 function as rails, and said lips 24 act as a pair of mutually converging members in an overlapped relation with said flanges 10, for preventing the displacement of the handle in a transverse relation with said flanges 10. Said flanges 10 function as guiding rails for permitting and guiding the longitudinal shifting movement of said horizontal bar 18 with relation to said base member 8.

Obviously, said flanges or divergent rails 10 need not be mutually interconnected through the central portion 9 of said base member 8. Said flanges or rails 10 may be directly welded or riveted to wall 6. The central portion 9, for connecting such flanges or rails 10 is a simple expedient in stamping or forming said base member 8. From this aspect of the invention the central bottom portion 9 of said base member 8 may be considered as part of wall 6 to which one end of the oblong latch member 11 may be directly welded or otherwise securely anchored.

The modifications hereinabove suggested, being of a simple nature, inhere in the invention.

While there are described herein preferred embodiments of the present invention, it is nevertheless to be understood that minor changes may be made therein without departing from the spirit and scope of the invention as claimed.

What I claim as new is:

In combination with a wall, an elongated base member having a bottom fixedly secured to said wall and in abutting relation therewith, a pair of parallel divergent rails extending from said bottom and in spaced relation with said wall, a handle, including a horizontal bar, a pair of parallel converging members depending from the margins of said horizontal bar, said converging members being adapted to engage said rails in an overlapping relation when the former are brought in an end to end relation with said rails for permitting longitudinal shifting of said converging members with relation to said rails for thereby interengaging said handle with said rails in a transverse relation therewith, said divergent rails being spaced from said wall a distance substantially equal to the thickness of said converging members so as to frictionally resist longitudinal movement of the converging members relative to said rails once they have been interengaged, a pair of transverse slots in said bottom defining a narrow transverse strip therebetween, an oblong, resilient latch member having one of its ends longitudinally bent into a U-shaped cradle, said U-shaped cradle engaging said transverse strip so that one leg portion extends upwardly through one of said transverse slots and said other leg portion extends upwardly through said other transverse slot and the bight portion underlies said transverse strip to securely hold said latch member to the wall intermediately of said rails, and an inverted U-shaped latch formed adjacent the opposite end of said latch member, due to the inherently resilient nature of said latch member, said inverted U-shaped latch being capable of normally flexing away from the wall, said horizontal bar intermediately of said converging members being provided with a slot therethrough into which said inverted U-shaped latch being capable of springing when said horizontal bar has been fully shifted in a longitudinally coincidental relation with said rails for thereby preventing shifting of said handle in either direction with relation to said rails for thereby interlocking said handle with the wall, said inverted U-shaped latch being capable of being depressed out of said slot for freeing said handle from its interlocked relation with the wall.

References Cited in the file of this patent
UNITED STATES PATENTS

| | | |
|---|---|---|
| 911,447 | Roessler | Feb. 2, 1909 |
| 1,106,031 | Beck | Aug. 4, 1914 |
| 1,317,715 | Luttringhaus | Oct. 7, 1919 |
| 2,152,081 | Nelson | Mar 28, 1939 |
| 2,200,158 | Clarke | May 7, 1940 |
| 2,905,500 | Thombs | Sept. 22, 1959 |